March 30, 1965  J. E. BEGGS  3,176,164
HIGH VACUUM THERMIONIC CONVERTER
Filed Nov. 3, 1958
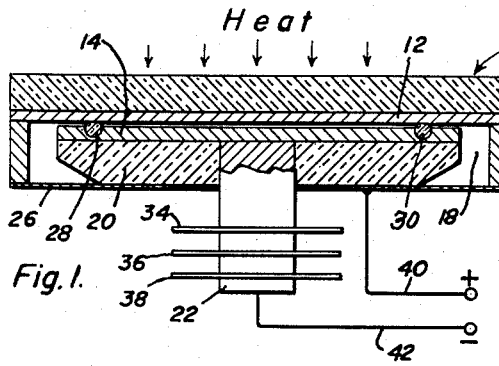
Fig. 1.
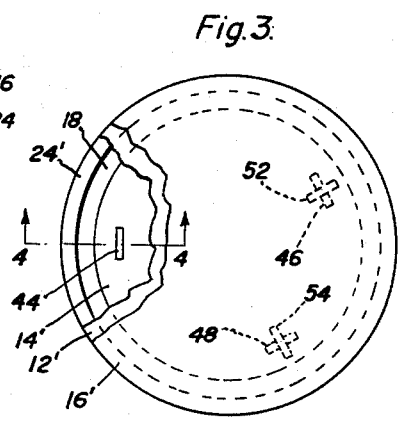
Fig. 3.
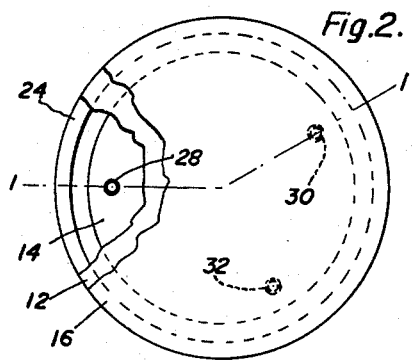
Fig. 2.
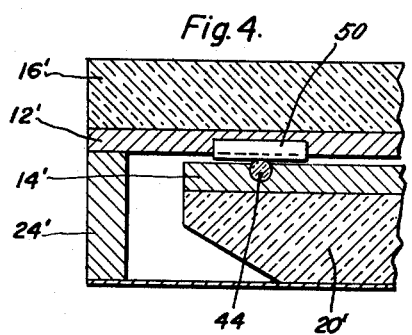
Fig. 4.
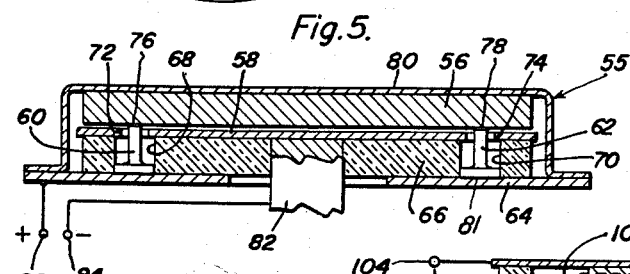
Fig. 5.
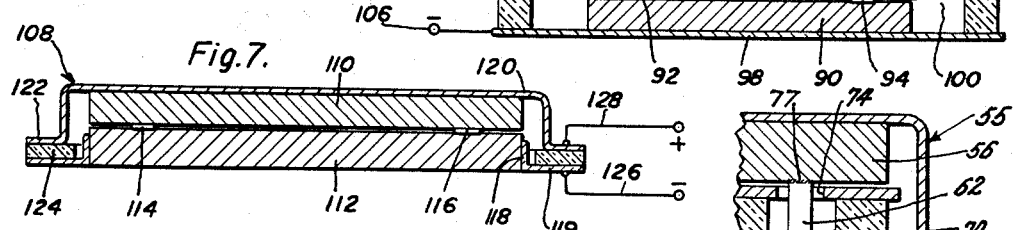
Fig. 6.
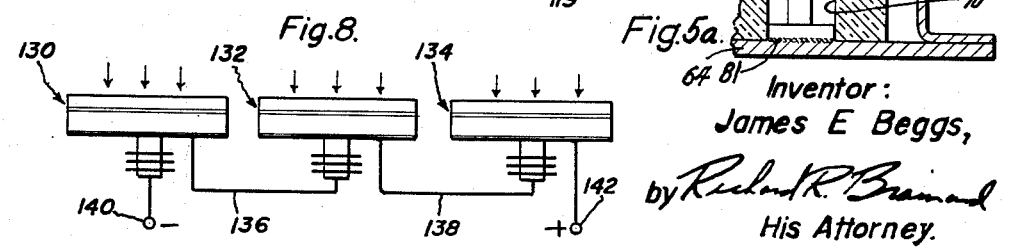
Fig. 7.
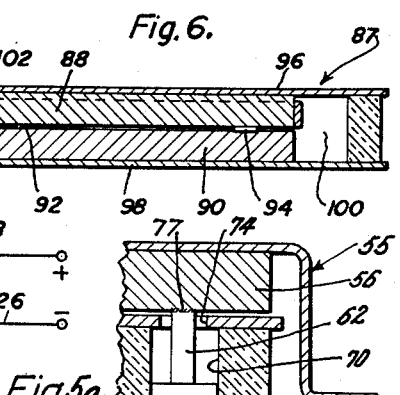
Fig. 5a.
Fig. 8.
Inventor:
James E Beggs,
by Richard R. Brainard
His Attorney.

United States Patent Office 3,176,164
Patented Mar. 30, 1965

3,176,164
HIGH VACUUM THERMIONIC CONVERTER
James E. Beggs, Schenectady, N.Y., assignor to General
Electric Company, a corporation of New York
Filed Nov. 3, 1958, Ser. No. 771,515
3 Claims. (Cl. 310—4)

This invention relates to a thermionic converter of the type having an electron emissive cathode and a spaced, electron collecting anode enclosed in an evacuated chamber and being responsive to heat applied to the cathode to produce an electron current flow from the cathode to the anode.

In thermionic converters of the aforementioned type, two factors adversely affecting efficiency and good performance thereof are the space charge effect and high heat transfer between cathode and anode. The space charge effect is a result of an accumulation of electrons in the interelectrode space between cathode and anode and the composite negative charge of such an accumulation of electrons has a repelling or retarding influence on electrons newly emitted from the cathode since these newly emitted electrons are also negatively charged. Accordingly, the retarding influence on the newly emitted electrons decreases the current flow between electrodes and decreases the efficiency of the converter. Input heat energy is supplied to the cathode to produce electron emission and high heat transfer from cathode to anode represents a loss since it decreases the energy available to produce electron emission and further has the undesirable tendency of transferring sufficient energy to the anode to increase the electron emission from the anode whereby the net number of electrons travelling from cathode to anode is reduced and the efficiency of the converter is also reduced.

Accordingly, it is a primary object of this invention to avoid or minimize the adverse effect in a thermionic converter of space charge in the interelectrode region and to minimize the transfer of heat from the cathode to the anode thereof thereby improving the performance and increasing the operating efficiency thereof.

Pursuant to the aforementioned object and in accordance with my invention, space charge in a thermionic converter having a heated cathode and a spaced anode preferably operable at a considerably lower temperature, is minimized by structural features facilitating a very small clearance between cathode and anode whereby the electrons that would otherwise form a space charge are collected by the anode and excessive heat transfer from the cathode to the anode is minimized by further structural features imposing a long path of high impedance to the heat flowing between the electrodes by condition. The construction is made so that radiative and conductive transfer of heat to the anode is insufficient to excessively heat the anode and thus, an effective limitation on excessive heat transfer is achieved.

Other and further objects and advantages will appear from a perusal of the following detailed description of the invention considered with the accompanying drawings in which:

FIG. 1 is an elevational view in cross-section of a thermionic converter according to one embodiment of my invention, FIG. 2 is a plan view of the thermionic converter shown in FIG. 1 partially cut away, showing particularly the relative position of the spacing supports between electrodes, FIG. 3 is a plan view partially cut away of a thermionic converter according to another embodiment of my invention and particularly showing the relative positioning of space supports between electrodes, FIG. 4 is a partial view in elevation showing the details of the spacer supports shown in FIG. 3, FIG. 5 is an elevational view in cross-section of a thermionic converter according to another embodiment of my invention, FIG. 5A is an enlarged partial view showing in detail a modification of the invention shown in FIG. 5, FIG. 6, is an elevational view in cross-section of a thermionic converter according to another embodiment of my invention, FIG. 7 is an elevational view in cross-section of a thermionic converter according to still another embodiment of my invention, and FIG. 8 is a view, partially schematic, showing the connection of a plurality of thermionic converters according to my invention in a series circuit arrangement.

Referring now to FIG. 1 of the drawings, 10 represents generally the entire thermionic converter of one embodiment of the invention and includes as principal elements thereof, a cathode electrode 12 preferably of nickel, titanium, or tungsten and coated with an electron emission enhancing material such as BaSrO facilitating copius electron emission at appropriate temperatures and a closely spaced anode electrode 14 preferably of platinum, molybdenum or nickel also having a thin coating of BaSrO for collecting the electron emitted by the cathode. Each of these electrodes is shown circular in shape as represented in FIG. 2, with the cathode electrode being somewhat larger than the anode electrode and each is of substantially uniform thickness with planar sides to establish the spacing between all parts of the electrodes substantially uniform. However, in a practical embodiment of the invention wherein a large plurality of converters are aggregated to produce a larger power output, it is to be understood that space may be more effectively utilized by making the converter and each of its electrodes polygonal in shape so that the sides thereof may interfit with each other and leave no idle space therebetween as would occur in the case of circular electrodes.

For elevating cathode electrode 12 to a temperature of emissivity, heat may be transferred thereto through an insulating, refractory element 16 preferably of some suitable ceramic such as alumina, and attached to the cathode as by brazing. A source of heat is indicated by the arrows in the drawing and may be derived from a flame, solar radiation, a nuclear reaction or any other source.

Anode electrode 14 is secured as by brazing to an annular insulating refractory member 20 of alumina or other suitable material and to an anode cooling post 22 described in more detail hereinbelow. For supporting anode 14 in position relative to cathode 12, a chamber 18, which may be evacuated or filled with a low pressure gaseous vapor of cesium or potassium or the like is established by a continuous ring 24 preferably of titanium secured at one end to an outer peripheral portion of cathode 12 and at the other end to an outer peripheral portion of an annular, foil disc 26 which is secured at its inner diameter to insulating, refractory ceramic member 20. Accordingly, atmospheric pressure applied to opposite sides of the converter is effective to urge the electrodes together since the foil member 26 is thin and flexible to allow such movement.

In accordance with a feature of this embodiment of my invention, a predetermined and close spacing between electrodes is accurately maintained, however, by a plurality of nonconductive sapphire members as shown at 28, 30 and 32, pressed into sockets preferably in the anode electrode to a depth leaving the members exposed to equal heights within a range of substantially .0001 inch to .001 inch. The members 28, 30 and 32 are preferably spheroidal in shape, being generally round but somewhat flattened at the areas of contact with the cathode. With this shape the heat transfer between members is maintained at a low value but the force urging the electrodes together is spread over the area of the flattened portions of the sapphire members. This area is large relative to the area of a point contact that would be presented by a substantially perfect sphere and thus the stresses on the sapphire members may be maintained low enough to prevent destruction thereof. Accordingly, the members engage the cathode electrode and the cathode and anode are prevented from direct contact. The force of ambient, atmospheric pressure maintains the contact between the sapphire members and each of the electrodes without the necessity of other biasing means. A fine adjustment for obtaining a uniform spacing between electrodes is obtainable by use of a thin metal foil to gauge the depth to which the spheres are pressed.

In accordance with the foregoing, it is observed that a minute spacing between the cathode and anode may be established and that the heat transfer from cathode to anode is achieved by radiation and conduction through the members 28, 30 and 32 and conduction throught foil 26. The members 28, 30 and 32 are of very small cross-section and are good insulators and the path through foil 26 is long and of small cross-section. Additionally, the foil is preferably of a material of low conductivity. Accordingly, a minimum of heat is transferred to the anode by the different paths of conduction.

As a further provision for maintaining anode 14 at a desirable temperature of operation, any excess heat received thereby is dissipated by radiating fins 34, 36 and 38 attached for good conduction to anode cooling post 22.

In operating the thermionic converter 10, the cathode may be heated to a temperature within the range from 700° C. to 1200° C. at which it exhibits a work function of approximately 1.6 to 2.6 electron volts while the anode is maintained at approximately 400° C. or less at which it exhibits a work function of approximately 1.4 to 1.1 electron volts. Thus, an output voltage appears across output leads 40 and 42 connected respectively to the cathode and anode circuits at relatively cool portions thereof and this output voltage is approximately equal to the difference between these work functions or approximately .5 to 1.5 volts for low output. For maximum power output at leads 40 and 42, a potential of approximately .25 to .75 volts may appear across these leads.

In accordance with another embodiment of the invention similar to that shown in FIGS. 1 and 2 and as shown in FIGS. 3 and 4 of the drawing, the spacing between electrodes may be established and maintained by sets of sapphire cylinders pressed into respective electrodes to a predetermined depth and aligned to engage the cylinders in the other electrode. A portion of each cylinder protrudes above the surface of the electrode whereby the combined protrusions of opposed cylinders determines the spacing betwen the electrodes. Thus, cylinders 44, 46 and 48 are pressed into the anode electrode 14' and these cylinders, as shown more clearly with respect to cylinders 44 at the cut away portion of cathode electrode 12', are positioned to extend generally circumferentially at vertices of an equilateral triangle. The cathode electrode 12 is provided with corresponding sapphire cylinders 50, 52 and 54 pressed into the cathode and extending in generally radial directions at vertices of an equilateral triangle. As shown more clearly in FIG. 4 of the drawings with respect to cylinders 44 and 50, the cylinders of pairs 44 and 50, 46 and 52 and 48 and 54, are in crosswise engagement with each other and each cylinder protrudes above the surface of the electrode into which it is pressed to establish the spacing between the electrodes. The crosswise engagement enables considerable angular movement of the electrodes relative to each other while maintaining a stable spacing arrangement. According to a satisfactory structure of this embodiment of invention, the cylinders each protrude substantially .0001 inch whereby the interelectrode spacing is maintained at .0002 inch. In other respects, the embodiment of invention shown in FIGS. 3 and 4 is substantially the same as that shown in FIGS. 1 and 2 and accordingly, similar parts are designated with the same numerals primed.

In accordance with a feature of another embodiment of my invention as shown generally at 55 in FIG. 5 of the drawings, a cathode electrode 56 is maintained spaced from an anode electrode 58 by a plurality of pillars, two of which are shown at 60 and 62, each having an enlarged base resting on and secured as by brazing at 81 to an annular cathode contact member 64 which is secured to one side of a ceramic insulator 66, the other side of which has anode 58 secured thereto. The pillars extend through openings as at 68 and 70 in the insulator 66 and through openings 72 and 74 in anode 58 and metal spacers 76 and 78 are disposed between the pillar ends and cathode 56 for final adjustment. It is to be observed that openings 68 and 70 are somewhat larger than respective openings 72 and 74 and that anode electrode 58 is somewhat larger at its periphery than the insulator 66 whereby anode electrode 58 overhangs the insulator about its periphery and at the edges of the openings therein. This feature of construction prevents the metal evaporated from the cathode from being deposited along the entire length of bores such as 68 and 70 and the outer periphery of insulator 66 to maintain the insulation between anode 58 and cathode contact member 64. Preferably, three pillars of the type shown at 60 and 62, equidistantly spaced are provided.

According to still another feature of a modification of this embodiment of my invention as shown in FIG. 5A of the drawings, pillars such as 60 and 62 may be secured as by brazing as at 77 and 81, to both cathode 56 and to contact member 64 at respective ends to maintain a predetermined spacing between the electrodes even in the absence of a pressure differential between inner and outer portions of the converter. Thus, such a converter is adaptable for use in outer space regions where atmospheric pressure is exceedingly low or non-existent.

A cup shaped cover 80 having cathode electrode 56 attached to the interior thereof is rigidly secured along an outer flange thereof to cathode contact member 64 to provide a firm base for pillars such as 60 and 62. Heat is conducted away from anode electrode 58 by a cooling post 82 secured to the anode and output line connections 84 and 86 are made to cathode contact member 64 and post 80.

Connections between components may be made by brazing and the interior of converter 55 is evacuated and made air tight to prevent admission of air or any other gases or other contaminant.

The several components of this embodiment of my invention may be made of various materials. For example, cathode electrode 56 may be tungsten, anode electrode 58 may be platinum, cathode contact member 64 may be titanium, pillars 60 and 62 may be molybdenum, tantalum or stainless steel, and cover 80 may be nichrome or stainless steel.

It should be noted that according to the structure shown in FIG. 5, the force maintaining the spacing between electrodes is between the cathode and the cathode contact member which is electrically connected to the cathode rather than between the cathode and anode. This structure further lessens the loss of heat by the cathode since one conductive path is lengthened and the other is maintained long and of high impedance.

According to another embodiment of my converter invention shown generally at 87 in FIG. 6 of the drawings, the spacing between a tungsten cathode 88 and a molybdenum anode 90 is maintained by three equidistantly spaced insulators as shown at 92 and 94 and which may be thin wafers or pieces of mica, alumina or other material. In this embodiment, the cathode and anode are secured to respective, opposed plates 96 and 98 which together with an annular insulator to which the plates are sealingly secured, form an enclosure 100. A titanium ring 102 may be disposed about cathode 88 to aid in maintaining the chamber 100, "hard" or free from oxidizing gases. Output leads 104 and 106 may be taken from plates 96 and 98.

The embodiment of my converter invention shown generally at 108 in FIG. 7 of the drawing is similar to converter 87 in that the cathode 110 and anode 112 are similar in structure and are similarly spaced by insulators as shown at 114 and 116 which may be mica, alumina or other suitable material. In the converter 108, however, a ring 118 having a radial flange 119 is secured to anode 112 and a cup shaped cover 120 having cathode 110 secured to an inner portion thereof is attached along a radial flange 122 to an annular insulator 124 which is also attached to flange 119. Purely as examples, in FIG. 7, the cathode may be tungsten, the anode molybdenum, cover 120 stainless steel or titanium and ring 118 may be titanium. Output leads 126 and 128 may be taken from flange 119 and 122.

As shown in FIG. 8 of the drawings, converters as shown at 130, 132 and 134 constructed in accordance with any embodiment of my invention herein disclosed may be electrically connected in series to provide an increased potential output. Line connection 136 extends between the cathode of converter 130 and the anode of converter 132 and line connection 138 extends from the cathode of converter 132 to the anode 134. The negative output terminal 140 is connected to the anode of converter 130 while the positive output terminal 142 is connected to the cathode of converter 134. Other numbers of converters may be connected in series circuit arrangements and different numbers of converters may be connected in parallel circuit arrangement for higher current output.

Having thus described this invention in such full, clear, concise and exact terms as to enable any person skilled in the art to which it pertains, to make and use the same and having set forth the best mode contemplated of carrying out this invention, I state that the subject matter which I regard as being my invention is particularly pointed out and distinctly claimed in what is claimed, it being understood that equivalents or modifications of or substitutions for parts of the above specifically described embodiment of this invention may be made without departing from the scope of the invention as set forth in what is claimed.

What I claim as new and desire to secure by Letters Patent of the United States is:

1. An apparatus comprising an electron emissive cathode electrode and an electron collecting anode electrode closely spaced to said cathode electrode, means for maintaining the spacing between said electrodes comprising a plurality of pillars secured at one end to said cathode electrode and secured at the other end to means rigid with said anode, said pillars being insulated from one of said electrodes.

2. A thermionic converter for converting heat energy into electrical energy comprising an electron emissive cathode electrode and an electron collecting anode electrode closely spaced to said cathode electrode, means for maintaining the spacing between said electrodes comprising a plurality of pillars extending from a point beneath the surface of said anode electrode and into contact with said cathode electrode, means for supporting said pillars and including a cathode contact member in conductive contact with said cathode electrode, and insulator means disposed between said anode electrode and said supporting means.

3. A thermionic converter for converting heat energy into electrical energy comprising an electron emissive cathode electrode and an electron collecting anode electrode closely spaced to said cathode electrode, means for maintaining the spacing between said electrodes and including a cathode contact member extending beneath said anode electrode and an insulating member disposed between said anode and said cathode member, a plurality of pillars supported by said cathode contact member and extending through bores in said insulating member and said anode electrode and into contact with said cathode electrode, the bores in said anode electrode being substantially smaller than the bores in said insulating member and said anode electrode having a peripheral dimension greater than the peripheral dimension of said insulating member.

References Cited by the Examiner
UNITED STATES PATENTS

| 1,509,515 | 9/24  | Little     | 313—268 |
| 2,437,576 | 3/48  | Wick       | 310—4   |
| 2,759,112 | 8/56  | Caldwell   | 310—4   |
| 2,863,074 | 12/58 | Johnstone  | 310—4   |
| 2,887,606 | 5/59  | Diemer et al. | 313—250 |
| 2,916,649 | 12/59 | Levin.     |         |

OTHER REFERENCES

Electrical World, July 21, 1958, "Heat Gives Electricity Directly."

MILTON O. HIRSHFIELD, *Primary Examiner*.

RALPH NIELSON, ORIS L. RADER, *Examiners*.